(12) United States Patent
Liu et al.

(10) Patent No.: US 11,690,379 B2
(45) Date of Patent: Jul. 4, 2023

(54) AQUEOUS INSECTICIDAL COMPOSITION AND METHODS OF USE THEREOF

(71) Applicant: Valent U.S.A. LLC, San Ramon, CA (US)

(72) Inventors: Jane Liu, Milpitas, CA (US); Tong Xu, Fremont, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 248 days.

(21) Appl. No.: 17/156,819

(22) Filed: Jan. 25, 2021

(65) Prior Publication Data

US 2021/0227829 A1 Jul. 29, 2021

Related U.S. Application Data

(60) Provisional application No. 62/966,150, filed on Jan. 27, 2020.

(51) Int. Cl.
| | |
|---|---|
| *A01N 47/06* | (2006.01) |
| *A01N 25/10* | (2006.01) |
| *A01N 25/04* | (2006.01) |
| *A01N 43/40* | (2006.01) |

(52) U.S. Cl.
CPC .............. *A01N 47/06* (2013.01); *A01N 25/04* (2013.01); *A01N 25/10* (2013.01); *A01N 43/40* (2013.01)

(58) Field of Classification Search
CPC ..................................................... A01N 47/06
See application file for complete search history.

(56) References Cited

U.S. PATENT DOCUMENTS

| | | |
|---|---|---|
| 2012/1015626 | 6/2012 | Gutsche et al. |
| 2014/0051572 A1* | 2/2014 | Grigera .................. A01N 43/36 514/28 |
| 2014/1005157 | 2/2014 | Grigera et al. |
| 2016/0050921 A1 | 2/2016 | Gygi et al. |
| 2016/0242418 A1 | 8/2016 | Baker et al. |
| 2017/0135347 A1 | 5/2017 | Kagami |

FOREIGN PATENT DOCUMENTS

| | | | |
|---|---|---|---|
| WO | 2019033918 A1 | 2/2019 | |
| WO | WO2019/033918 | * 2/2019 | ............. A01N 47/06 |

OTHER PUBLICATIONS

International Search Report and Written Opinion dated Apr. 16, 2021.

* cited by examiner

*Primary Examiner* — Paul V Ward
(74) *Attorney, Agent, or Firm* — Wood, Phillips, Katz, Clark & Mortimer

(57) ABSTRACT

The present invention is directed to an aqueous composition comprising spirotetramat, pyriproxyfen, a solvent system comprising heavy aromatic naphtha, cottonseed oil and optionally, acetyl tributyl citrate, one or more poly(ethylene oxide)-poly(propylene oxide)-poly(ethylene oxide) block copolymers and an acrylic type co-polymer having a backbone containing a carboxylated ethylenically unsaturated monomer and a non-carboxylated ethylenically unsaturated monomer and water. The present invention is further directed to methods of controlling pests by applying the compositions of the invention to an area in need thereof.

19 Claims, No Drawings

AQUEOUS INSECTICIDAL COMPOSITION AND METHODS OF USE THEREOF

FIELD OF THE INVENTION

The present invention is directed to an aqueous composition comprising spirotetramat, pyriproxyfen, a solvent system comprising cottonseed oil, heavy aromatic naphtha and optionally, acetyl tributyl citrate, one or more poly(ethylene oxide)-poly(propylene oxide)-poly(ethylene oxide) block copolymers, an acrylic type co-polymer having a backbone containing a carboxylated ethylenically unsaturated monomer and a non-carboxylated ethylenically unsaturated monomer and water. The present invention is further directed to methods of controlling pests by applying the compositions of the invention to an area in need thereof.

BACKGROUND OF THE INVENTION

Arthropod pests, including insects and mites, are one of the major threats to human welfare, exert continued stress on the food supply and transmit a broad array of medical and veterinary diseases. Insect pests can cause severe and costly damage to crops, ornamental plants and stored foods. Further, insect and mite pests transmit diseases in and among humans resulting in reduced life expectancy, reduced quality of life and increased medical costs.

Aphids are highly problematic and costly pests of cultivated plants. There are approximately 250 described species of aphids that are known to eat crops, trees and ornamental plants. Aphids feed on the nectar of plants causing decreased growth rates, low yields and death. Aphids are also vectors for many microscopic plant pathogens spreading disease from plant to plant. Efforts to control aphids include synthetic pesticide application and the introduction of natural predators. While aphids have numerous natural predators such as ladybirds and parasitic wasps, predators and parasitoids alone are not effective at preventing crop plant damage by aphids. Unfortunately, aphids have also developed resistance to many common pesticides.

Another costly insect pest is the whitefly. Like aphids, whiteflies feed on the nectar of plants and introduce plant pathogens through their saliva. Whiteflies are particularly difficult to control as they readily develop resistance to pesticides. One particularly problematic whitefly is the silverleaf whitefly (*Bemisia tabaci.*) The silverleaf whitefly is well distributed as it is found in geographies as varied as Australia, Africa, the United States and several European countries. In the 1980's a particularly virulent strain of silverleaf whiteflies was found in poinsettia crops in Florida. Within 5 years this silverleaf whitefly strain had spread to numerous other crops and has caused over $1 billion in damages to the agricultural industries across the United States. The silverleaf whitefly is also responsible for spreading plant viruses such as the tomato yellow leaf curl virus that causes premature ripening. Unfortunately, whiteflies have developed resistance to many common pesticides.

Mites are another pest of economic importance. Two spotted spider mites are of particular importance as they have been reported to infest more than 200 different plant species. These species include woody plants, ornamentals, fruit crops, vegetable crops and greenhouse crops. Mites feed by using their piercing-sucking mouthparts to extract sap from leaves. After leaves are pierced, chlorotic spots occur, eventually leading necrosis and possible defoliation. Mites have many natural enemies such as predatory mites (including *Phytoseiulus persimilis, Mesoseiulus longipes, Neoseiulus californicus, Galendromus occidentalis* and *Amblyseius fallicusare*) and insects (including *Scolothrips sexmaculatus, Stethorus picipes, Feltiella acarivora* and others). Predators and parasitoids alone are not effective at preventing crop plant damage by mites. Unfortunately, mites have also developed resistance to many common pesticides.

Spirotetramat, or cis-3-(2,5-dimethylphenyl)-8-methoxy-2-oxo-1-azaspiro[4.5]dec-3-en-4-ylethyl carbonate, is a keto-enol insecticide and acts as an ACC inhibitor. Spirotetramat is commercially available as the active ingredient in Movento® and Ultor® available from Bayer CropScience. The main target of spirotetramat is crop damaging insects such as aphids and whiteflies and mites. Spirotetramat has a high-melting point and is practically insoluble in water.

Pyriproxyfen, or 4-Phenoxyphenyl (R/S)-2-(2-pyridyloxy)propyl ether, is a juvenile hormone analog that acts as an insect growth regulator. Pyriproxyfen is commercially available as the active ingredient in Nyguard® available from McLaughlin Gormley King Company and Knack®, Esteem® 35 WP and Esteem® Ant Bait available from Valent USA LLC. Pyriproxyfen was introduced into the United States in 1996 for the control of whiteflies. Pyriproxyfen has a low-melting point and is normally formulated as an emulsifiable concentrate.

Due to the resistance being developed by aphids, whiteflies and mites, a mixture of insecticides such as spirotetramat and pyriproxyfen would be beneficial. However, attempts to combine spirotetramat and pyriproxyfen into a single composition have proven problematic. One such attempt is detailed in CN107439569. In CN107439569, discloses an oil-based composition where spirotetramat is suspended and pyriproxyfen is dissolved in oil. This composition still needs to be diluted in water prior to application and thus is problematic due to its oil-based nature.

Accordingly, there is a need in the art for an aqueous composition containing a mixture of spirotetramat and pyriproxyfen.

SUMMARY OF THE INVENTION

The present invention is directed to aqueous compositions comprising:
- spirotetramat;
- pyriproxyfen;
- a solvent system comprising heavy aromatic naphtha, cottonseed oil and optionally, acetyl tributyl citrate;
- one or more poly(ethylene oxide)-poly(propylene oxide)-poly(ethylene oxide) block copolymers;
- an acrylic type co-polymer having a backbone containing a carboxylated ethylenically unsaturated monomer and a non-carboxylated ethylenically unsaturated monomer; and
- water.

The present invention is further directed to methods of controlling a pest comprising applying the compositions of the invention to an area in need of pest control.

DETAILED DESCRIPTION OF THE INVENTION

The applicant has discovered unique mixtures of solvents, emulsifiers and dispersants capable of forming a stable suspo-emulsion of spirotetramat and pyriproxyfen.

In one embodiment, the present invention is directed to an aqueous composition comprising:
- spirotetramat;
- pyriproxyfen;

a solvent system comprising heavy aromatic naphtha, cottonseed oil and optionally, acetyl tributyl citrate;

one or more poly(ethylene oxide)-poly(propylene oxide)-poly(ethylene oxide) block copolymers;

an acrylic type co-polymer having a backbone containing a carboxylated ethylenically unsaturated monomer and a non-carboxylated ethylenically unsaturated monomer; and water.

In a preferred embodiment, the present invention is directed to an aqueous composition comprising:

from about 5% to about 25% w/w spirotetramat;

from about 1% to about 10% w/w pyriproxyfen;

from about 1% to about 15% w/w of a solvent system comprising cottonseed oil, heavy aromatic naphtha and optionally, acetyl tributyl citrate;

from about 1% to about 10% w/w one or more poly(ethylene oxide)-poly(propylene oxide)-poly(ethylene oxide) block copolymers;

from about 0.1% to about 5% w/w of an acrylic type co-polymer having a backbone containing a carboxylated ethylenically unsaturated monomer and a non-carboxylated ethylenically unsaturated monomer; and from about 40% to about 92% w/w water.

In a more preferred embodiment, the present invention is directed to an aqueous composition comprising:

about 11.5% w/w spirotetramat;

about 4.0% w/w pyriproxyfen;

from about 3.0 to about 5.7% w/w heavy aromatic naphtha;

optionally, about 2.7% w/w acetyl tributyl citrate;

from about 2.4 to about 3.8% w/w cottonseed oil;

about 0.3% w/w of a poly(ethylene oxide)-poly(propylene oxide)-poly(ethylene oxide) block copolymer having an average molecular weight of 4950 and a hydrophile weight percentage of 30%;

about 5.0% w/w of a poly(ethylene oxide)-poly(propylene oxide)-poly(ethylene oxide) block copolymer having an average molecular weight of 3650 and a hydrophile weight percentage of 20%;

about 1.0% w/w of an acrylic type co-polymer having a backbone containing a carboxylated ethylenically unsaturated monomer and a non-carboxylated ethylenically unsaturated monomer; and about 61.8% w/w water.

In another more preferred embodiment, the present invention is directed to an aqueous composition comprising:

about 11.5% w/w spirotetramat;

about 4.0% w/w pyriproxyfen;

from about 3.0 to about 5.7% w/w heavy aromatic naphtha;

optionally, about 2.7% w/w acetyl tributyl citrate;

from about 2.4 to about 3.8% w/w cottonseed oil;

about 3.1% w/w of a poly(ethylene oxide)-poly(propylene oxide)-poly(ethylene oxide) block copolymer having an average molecular weight of 5900 and a hydrophile weight percentage of 40% or about 3.1% w/w of a poly(ethylene oxide)-poly(propylene oxide)-poly(ethylene oxide) block copolymer having an average molecular weight of 7900 and a hydrophile weight percentage of 40%;

about 1.0% w/w of an acrylic type co-polymer having a backbone containing a carboxylated ethylenically unsaturated monomer and a non-carboxylated ethylenically unsaturated monomer; and about 61.8% w/w water.

Spirotetramat may be present in compositions of the present invention at a concentration from about 1% to about −30% w/w, preferably from about 5% to about 25% w/w, more preferably from about 10% to about 14% w/w and even more preferably at about 11.5% w/w.

Pyriproxyfen may be present in compositions of the present invention at a concentration from about 1% to about 20% w/w, preferably from about 1% to about 10% w/w, more preferably from about 2% to about 6% w/w and even more preferably at about 4.0% w/w.

The solvent system comprising heavy aromatic naphtha, cottonseed oil and optionally, acetyl tributyl citrate and cottonseed oil may be present in compositions of the present invention at a concentration from about 1% to about 25% w/w, preferably from about 1% to about 15% w/w, more preferably from about 6% to about 10% w/w and even more preferably at about 8.2% w/w.

Heavy aromatic naphtha may be present in compositions of the present invention at a concentration from about 1% to about 10% w/w, preferably from about 1% to about 8% w/w, more preferably from about 2% to about 7% w/w and even more preferably from about 3.0 to about 5.7% w/w.

Acetyl tributyl acetate may be present in compositions of the present invention at a concentration from about 1% to about 10% w/w, preferably from about 1% to about 5% w/w, more preferably from about 2% to about 4% w/w and even more preferably at about 2.7% w/w.

Cottonseed oil may be present in compositions of the present invention at a concentration from about 1% to about 10% w/w, preferably from about 1% to about 5% w/w, more preferably from about 2% to about 4% w/w and even more preferably from about 2.4% to about 3.7% w/w.

The one or more poly(ethylene oxide)-poly(propylene oxide)-poly(ethylene oxide) block copolymers may be present in compositions of the present invention at a concentration from about 1% to about 20% w/w, preferably from about 1% to about 10% w/w, more preferably from about 1% to about 7% w/w and even more preferably at about 5.3% or about 3.1% w/w.

Poly(ethylene oxide)-poly(propylene oxide)-poly(ethylene oxide) block copolymers suitable for use in the present invention include, but are not limited to, a poly(ethylene oxide)-poly(propylene oxide)-poly(ethylene oxide) block copolymer having an average molecular weight of 3650 and a hydrophile weight percentage of 20%, a poly(ethylene oxide)-poly(propylene oxide)-poly(ethylene oxide) block copolymer having an average molecular weight of 4950, a hydrophile weight percentage of 30%, a poly(ethylene oxide)-poly(propylene oxide)-poly(ethylene oxide) block copolymer having an average molecular weight of 5900 and a hydrophile weight percentage of 40%, a poly(ethylene oxide)-poly(propylene oxide)-poly(ethylene oxide) block copolymer having an average molecular weight of 7900 and a hydrophile weight percentage of 40% and mixtures thereof.

The poly(ethylene oxide)-poly(propylene oxide)-poly(ethylene oxide) block copolymer having an average molecular weight of 4950 and a hydrophile weight percentage of 30% may be present in compositions of the present invention at a concentration from about 0.01% to about 10% w/w, preferably from about 0.1% to about 1% w/w, more preferably from about 0.2% to about 0.4% w/w and even more preferably at about 0.3% w/w.

The poly(ethylene oxide)-poly(propylene oxide)-poly(ethylene oxide) block copolymer having an average molecular weight of 3650 and a hydrophile weight percentage of 20% may be present in compositions of the present invention at a concentration from about 1% to about 20% w/w, preferably from about 1% to about 10% w/w, more preferably from about 4% to about 6% w/w and even more preferably at about 5.0% w/w.

The acrylic type co-polymer having a backbone containing a carboxylated ethylenically unsaturated monomer and a non-carboxylated ethylenically unsaturated monomer may be present in compositions of the present invention at a concentration from about 0.1% to about 10% w/w, preferably from about 0.1% to about 5% w/w, more preferably from about 0.5% to about 2% w/w and even more preferably at about 1.0% w/w.

Compositions of the present invention may further comprise one or more excipients selected from the group consisting of an anti-freeze agent, an additional dispersant, an anti-foam agent, a thickener and a preservative.

Anti-freeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylolpropane, mannitol, sorbitol, glycerin, pentaerythritol, 1,4-cyclohexanedimethanol, xylenol, bisphenols and mixtures thereof. In a preferred embodiment, the anti-freeze agent is propylene glycol.

Anti-freeze agents may be present in compositions of the present invention at a concentration from about 1% to about 20% w/w, preferably from about 1% to about 10% w/w, more preferably from about 4% to about 8% w/w and even more preferably at about 6.5% w/w.

Additional dispersants suitable for use in the present invention include, but are not limited to, sodium salt of naphthalene sulfonate condensate, sodium and ammonium salts of naphthalene sulfonate-formaldehyde condensates; sodium, calcium and ammonium salts of ligninsulfonates (optionally polyethoxylated); sodium and ammonium salts of maleic anhydride copolymers, sodium salts of condensed phenolsulfonic acid, and mixtures thereof. In a preferred embodiment the dispersant is a sodium salt of naphthalene sulfonate condensate.

Additional dispersants may be present in compositions of the present invention at a concentration from about 0.01% to about 10% w/w, preferably from about 0.1% to about 1% w/w, more preferably from about 0.4% to about 0.6% w/w and even more preferably at about 0.5% w/w.

Anti-foam agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonyl- and phenylpolyoxyethylene/ethylene oxide units is >5) and long-chain alcohols and mixtures thereof. In a preferred embodiment, the anti-foam agent is a silicone emulsion.

Anti-foam agents may be present in compositions of the present invention at a concentration from about 0.01% to about 1% w/w, preferably from about 0.05% to about 0.5% w/w, more preferably form about 0.05% to about 0.2% w/w and even more preferably at about 0.1%, about 0.09% or about 0.15% w/w.

Thickeners suitable for use in the present invention include, but are not limited to, hydroxyethyl cellulose, magnesium aluminum silicate, attapulgite, hydrophilic fumed silica, aluminum oxide, xanthan gum and mixtures thereof. In a preferred embodiment, the thickener is a mixture of magnesium aluminum silicate and xanthan gum.

Thickeners may be present in compositions of the present invention at a concentration from about 0.01% to about 5% w/w, preferably from about 0.1% to about 5% w/w, more preferably form about 0.5% to about 2% w/w and even more preferably at about 0.9% w/w.

The magnesium aluminum silicate may be present in compositions of the present invention at a concentration from about 0.01% to about 5% w/w, preferably from about 0.1% to about 5% w/w, more preferably form about 0.4% to about 0.8% w/w and even more preferably at about 0.6% w/w.

The xanthan gum may be present in compositions of the present invention at a concentration from about 0.01% to about 5% w/w, preferably from about 0.1% to about 5% w/w, more preferably form about 0.2% to about 0.4% w/w and even more preferably at about 0.3% w/w.

Preservatives suitable for use in the present invention include, but are not limited to, a 1.15% 5-chloro-2-methyl-4-isothiazolin-3-one and 0.35% 2-methyl-4-isothiazolin-3-one solution in water, such as Kathon® CG/ICP (available from Rohm and Haas Company) and Legend MK® (available from Rohm and Haas Company), 19.3% 1, 2-benzisothiazolin-3-one and mixtures thereof. In a preferred embodiment the preservative is 19.3% 1, 2-benzisothiazolin-3-one.

The 19.3% 1, 2-benzisothiazolin-3-one may be present in compositions of the present invention at a concentration from about 0.01% to about 5% w/w, preferably from about 0.1% to about 5% w/w, more preferably form about 0.2% to about 0.4% w/w and even more preferably at about 0.3% w/w.

Water may be present in compositions of the present invention at a concentration from about 10% to about 99% w/w, preferably from about 40% to about 92% w/w, more preferably from about 50% to about 70% w/w and even more preferably from about 60% to about 65% w/w and most preferably about 61.8% or about 64.0% w/w.

In another embodiment the present invention is directed to methods of controlling a pest comprising applying the compositions of the invention to an area in need of pest control.

Pests that may be controlled by compositions of the present invention include, but are not limited to, psyllids, mealybugs, aphids, whiteflies and mites.

As used herein the term "psyllids" refers to pests that belong to the Family Liviidae of Order Hemiptera.

As used herein the term "mealybugs" refers to pests that belong to the Family Psuedococcidae of Order Hemiptera.

As used herein, "aphids" refers to pests that belong to the Superfamily Aphidoidea of Order Hemiptera.

As used herein, "whiteflies" refers to pests that belong to the Family Aleyrodidae of Order Hemiptera.

As used herein, "mites" refers to pests that belong to the Subclass Acari of Class Arachnida.

As used herein, "controlling a pest" refers to decreasing the negative impact of the pest on plants or animals to a level that is desirable to the grower or animal.

As used herein, "an area in need of pest control" refers to any area where the pest is present during any life stage. One environment likely to be treated by the methods of the present invention includes the plants that the pest is living on/in and the surrounding soil. The pest's environment may also include harvested plants, gardens, fields, greenhouses, or other buildings, and various indoor surfaces and structures, such as furniture including beds, and furnishings including books, clothing, etc.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

form pyriproxyfen concentrate emulsion. The homogenization process was complete once the median particle size reaches 0.5-3.0 microns. In a separate container, xanthan gum thickener premix was prepared by dissolving 1.5% xanthan gum and 1.5% 1, 2-benzisothiazolin-3-one in water under high shear agitation until homogenous. The final suspo-emulsion was made by mixing spirotetramat suspension, aqueous pyriproxyfen concentrate emulsion, an acrylic type co-polymer, rest of propylene glycol, xanthan gum thickener premix and rest of the water under high shear agitation.

TABLE 1

| % w/w | #1 | #2 | #3 | #4 | #5 |
|---|---|---|---|---|---|
| Spirotetramat | 11.47 | 11.47 | 11.47 | 11.47 | 11.47 |
| Pyriproxyfen | 4.01 | 4.01 | 4.01 | 4.01 | 4.01 |
| Heavy aromatic naphtha | 3.014 | 3.014 | 4.414 | 5.722 | 2.1 |
| Acetyl tributyl citrate | 2.708 | 2.708 | — | — | — |
| Cottonseed oil | 2.44 | 2.44 | 3.748 | 2.44 | — |
| Methyl oleate | — | — | — | — | 7.6 |
| Polyalkylene oxide block copolymer | — | 3.058 | 3.058 | 3.058 | — |
| A poly(ethylene oxide)-poly(propylene oxide)-poly(ethylene oxide) block copolymer having an average molecular weight of 3650 and a hydrophile weight percentage of 20% | 5.0 | — | — | — | — |
| A poly(ethylene oxide)-poly(propylene oxide)-poly(ethylene oxide) block copolymer having an average molecular weight of 4950 and a hydrophile weight percentage of 30% | 0.308 | — | — | — | 5 |
| Sodium salt of naphthalene sulfonate condensate | 0.462 | 0.462 | 0.462 | 0.462 | 0.462 |
| An acrylic type co-polymer having a backbone containing a carboxylated ethylenically unsaturated monomer and a non-carboxylated ethylenically unsaturated monomer | 1.0 | 1.0 | 1.0 | 1.0 | 1.0 |
| Silicone emulsion | 0.09 | 0.15 | 0.15 | 0.15 | 0.15 |
| Magnesium aluminum silicate | 0.6 | 0.6 | 0.6 | 0.6 | 0.6 |
| Xanthan gum | 0.3 | 0.3 | 0.3 | 0.3 | 0.3 |
| 19.3% 1, 2-benzisothiazolin-3-one | 0.3 | 0.3 | 0.3 | 0.3 | 0.3 |
| Propylene Glycol | 6.5 | 6.5 | 6.5 | 6.5 | 6.5 |
| Water | 61.798 | 63.988 | 63.988 | 63.988 | 60.508 |

Further, the following examples are offered by way of illustration only and not by way of limitation.

EXAMPLES

Example 1. Preparation of Compositions of the Invention

A spirotetramat suspension is created by first mixing propylene glycol, polyalkylene oxide block copolymer (pre-heat to melt if the copolymer is solid at room temperature), sodium salt of naphthalene sulfonate condensate, silicone emulsion, and water under agitation until homogenous to create a liquid mixture. Magnesium aluminum silicate and spirotetramat TG were then added to the liquid mixture under high shear agitation to create a slurry. A basket mill (bead mill) (Dispersmat AE-C equipped with TML-1 basket milling system) was used to mill the spirotetramat slurry. The slurry was milled using 1.2-1.7 mm zirconium oxide beads. The mill process was complete once the median particle size of the slurry reaches 1.5-2.5 microns.

An aqueous pyriproxyfen concentrate emulsion is created by first dissolving pyriproxyfen in oil solvents (heavy aromatic naphtha, cottonseed oil and, optionally acetyl tributyl citrate) under low shear agitation. The water phase is prepared by mixing water, polyalkylene oxide block copolymer and silicone emulsion under agitation until homogeneous. Silverson high shear homogenizer L5M-A (rotor-stator type) is then used to emulsify the oil phase into the water phase to Aromatic 200ND (CAS #64742-94-5) was used as the source of heavy aromatic naphtha and is available from ExxonMobil™.

Citroflex® A-4 was used as the source of acetyl tributyl citrate (Citroflex is a registered trademark of and available from Vertellus Holdings LLC).

Step-Flow® 26F was used as the source of was used as the source of a poly(ethylene oxide)-poly(propylene oxide)-poly(ethylene oxide) block copolymer. Step-Flow® 26F has an average molecular weight of 7900 and a hydrophile weight percent of 40% (Step-Flow is a registered trademark of and available from Stepan Company Corporation).

Pluronic® L92 was used as the source of a poly(ethylene oxide)-poly(propylene oxide)-poly(ethylene oxide) block copolymer. Pluronic® L92 has an average molecular weight of 3650 and a hydrophile weight percentage of 20%.

Pluronic® P103 was used as the source of a poly(ethylene oxide)-poly(propylene oxide)-poly(ethylene oxide) block copolymer (Pluronic is a registered trademark of and available from BASF Corporation). Pluronic® P103 has an average molecular weight of 4950 and a hydrophile weight percentage of 30%.

Morwet® D-425 was used as the source of sodium salt of naphthalene sulfonate condensate (Morwet is a registered trademark of and available from Nouryon).

Envi-pol® 871 was used as the source of an acrylic type co-polymer having a backbone containing a carboxylated ethylenically unsaturated monomer and a non-carboxylated ethylenically unsaturated monomer (Envi-pol is a registered trademark of and available from Lamberti SPA).

Xiameter® AFE-0010 was used the source of silicone emulsion (Xiameter is a registered trademark of and available from Dow Corning Corporation).

Veegum® R (CAS #12199-37-0) is used as the source of magnesium aluminum silicate (Veegum is a registered trademark of and available from Vanderbilt Minerals, LLC).

Kelzan® CC was used as the source of xanthan gum (Kelzan is a registered trademark of and available from CP Kelco).

Proxel® GXL was used as the source of 19.3% 1, 2-benzisothiazolin-3-one (Proxel is a registered trademark of Arch UK Biocides and is available from Lonza).

Example 2. Sprayability

Methods

Compositions #1-#5 from Table 1, above, were subject to storage at 54° C. for 2 weeks. Following storage sprayability was determined. Sprayability is based on the following test procedure and calculation. A 100-mesh (150 micrometer) sieve is weighed and the weight is recorded as the tare weight ("W0"). The sieve is then placed over a wide mouth jar.

The entire formulation was weighed (W) and poured through the sieve followed by rinsing. Rinsing was done using tap water at a flow rate at about 1.5 liters per minute for one minute. The sieve with the residue was then placed in a drying oven and dried to create the dry sieve with the residue ("W1"). Percent sprayability was then calculated with the following equation: (W1−W0)/W*100.

A large percent sprayability indicates poor composition stability leading to nozzle clogging during field application. In embodiments, the aqueous insecticide compositions have an excellent long-term stability. The long-term stability can be measured using the parameter of sprayability by subjecting the composition through the following conditions: 2 weeks at 54° C. Composition with a good long-term stability should have a sprayability no more than 0.05% w/w, including no more than 0.03% w/w, or no more than 0.025% w/w.

Results

Compositions #1-#4 had a sprayability of about 0% w/w. However, Composition #5 had a sprayability greater than 0.05% w/w. Thus, the solvent system containing heavy aromatic naphtha, cottonseed oil and optionally, acetyl tributyl citrate and is better at dissolving pyriproxyfen than other solvent systems.

Example 3. Pyriproxyfen Emulsion in Water

TABLE 2

| % w/w | A | B | C | D | E | F | G | H | I | J | K |
|---|---|---|---|---|---|---|---|---|---|---|---|
| Pyriproxyfen oil solution | 12.5 | 12.2 | 12.5 | 12.5 | 12.5 | 12.5 | 12.5 | 12.2 | 12.5 | 12.5 | 12.5 |
| A poly(ethylene oxide)-poly(propylene oxide)-poly(ethylene oxide) block copolymer having an average molecular weight of 3650 and a hydrophile weight percentage of 20% | 5.0 | — | 5.0 | 5.0 | 5.0 | 5.0 | 5.0 | — | — | — | — |
| A poly(ethylene oxide)-poly(propylene oxide)-poly(ethylene oxide) block copolymer having an average molecular weight of 4950 and a hydrophile weight percentage of 30% | 0.25 | — | 0.5 | 0.55 | — | — | — | — | — | — | — |
| A poly(ethylene oxide)-poly(propylene oxide)-poly(ethylene oxide) block copolymer having an average molecular weight of 5900 and a hydrophile weight percentage of 40% | — | 3.0 | — | — | 0.25 | 0.5 | 0.55 | 1.0 | — | — | — |
| Copolymer of maleic acid and olefin | — | — | — | — | — | — | — | — | 3.0 | — | — |
| Ethoxylated castor oil, poly(ethylene oxide) 5 | — | — | — | — | — | — | — | — | — | 5.0 | — |
| Ethoxylated castor oil, poly(ethylene oxide) 25 | — | — | — | — | — | — | — | — | — | — | 5.0 |
| Silicone emulsion | 0.04 | 0.04 | 0.04 | 0.04 | 0.04 | 0.04 | 0.04 | 0.04 | 0.04 | 0.04 | 0.035 |
| Water | 18.8 | — | 17.5 | 16.3 | 18.8 | 17.5 | 16.3 | 10.0 | 17.0 | 20.0 | 20.0 |

Pluronic® P104 was used as the source of a poly(ethylene oxide)-poly(propylene oxide)-poly(ethylene oxide) block copolymer (Pluronic is a registered trademark of and available from BASF Corporation). Pluronic® P104 has an average molecular weight of 5900 and a hydrophile weight percentage of 40%.

Sokalan® CP9 was used as the source of copolymer of maleic acid and olefin (Sokalan is a registered trademark of and available from BASF Aktiengesellschaft Corporation).

Agnique® CSO-5-G was used as the source of ethoxylated castor oil, poly(ethylene oxide) 5 (Agnique is a registered trademark of and available from Cognis). Agnique® CSO-25 was used as the source of ethoxylated castor oil, poly(ethylene oxide) 25 (Agnique is a registered trademark of and available from Cognis).

Methods

Compositions A-K from Table 2, above, were homogenized and subjected to particle size analysis. 0.5 grams of each sample was diluted in 10 grams of deionized water, and then a Malvern Mastersizer 2000 with Fraunhofer model was used for the particle size analysis on the diluted sample.

Results

Compositions A and B resulted in single, narrow peaks indicating discrete particle size distribution and successful emulsion of pyriproxyfen in water. Compositions C-I resulted in bimodal, trimodal and broad peaks indicating a broad range of particle sizes and unsuccessful emulsion of pyriproxyfen in water. Compositions J and K gelled upon homogenization. Thus, poly(ethylene oxide)-poly(propylene oxide)-poly(ethylene oxide) block copolymers were found to be better at emulsifying pyriproxyfen in water than other emulsifiers.

Example 4. Sprayability and Dispersibility with Various Dispersants

TABLE 3

| % w/w | #1 | L | M | N | O | P | Q | R |
|---|---|---|---|---|---|---|---|---|
| Spirotetramat | 11.47 | 11.47 | 11.47 | 11.47 | 11.47 | 11.47 | 11.47 | 11.47 |
| Pyriproxyfen | 4.01 | 4.01 | 4.01 | 4.01 | 4.01 | 4.01 | 4.01 | 4.01 |
| Heavy aromatic naphtha | 3.014 | 3.014 | 3.014 | 3.014 | 3.014 | 3.014 | 3.014 | 3.014 |
| Acetyl tributyl citrate | 2.708 | 2.708 | 2.708 | 2.708 | 2.708 | 2.708 | 2.708 | 2.708 |
| Cottonseed oil | 2.44 | 2.44 | 2.44 | 2.44 | 2.44 | 2.44 | 2.44 | 2.44 |
| A poly(ethylene oxide)-poly(propylene oxide)-poly(ethylene oxide) block copolymer having an average molecular weight of 3650 and a hydrophile weight percentage of 20% | 5.0 | 5.0 | 5.0 | 5.0 | 5.0 | 5.0 | 5.0 | 5.0 |
| A poly(ethylene oxide)-poly(propylene oxide)-poly(ethylene oxide) block copolymer having an average molecular weight of 4950 and a hydrophile weight percentage of 30% | 0.308 | 0.308 | 0.308 | 0.308 | 0.308 | 0.308 | 0.308 | 0.308 |
| Sodium salt of naphthalene sulfonate condensate | 0.462 | 0.462 | 0.462 | 0.462 | 0.462 | 0.462 | 0.462 | 0.462 |
| An acrylic type co-polymer having a backbone containing a carboxylated ethylenically unsaturated monomer and a non-carboxylated ethylenically unsaturated monomer | 1.0 | — | — | — | — | — | — | — |
| 35% graft copolymer | — | — | 1.0 | — | — | — | — | — |
| A soft anionic polymer based on a methyl methacrylate backbone grafted with polyethylene glycol | — | — | — | 1.0 | — | — | — | — |
| A lignin, alkali, reaction product with formaldehyde and sodium bisulfite | — | — | — | — | 1.0 | — | — | — |
| A spray-dried, optimized composite polyvinyl pyrrolidone and methyl vinyl ether/maleic acid half ester dispersant | — | — | — | — | — | 1.0 | — | — |
| Polyoxyethylene tristyrylphenol phosphate, potassium salt | — | — | — | — | — | — | 1.0 | — |
| A sodium polyacrylate having a molecular weight of 3500 | — | — | — | — | — | — | — | 1.0 |
| Silicone emulsion | 0.09 | 0.09 | 0.09 | 0.09 | 0.09 | 0.09 | 0.09 | 0.09 |
| Magnesium aluminum silicate | 0.6 | 0.6 | 0.6 | 0.6 | 0.6 | 0.6 | 0.6 | 0.6 |

TABLE 3-continued

| % w/w | #1 | L | M | N | O | P | Q | R |
|---|---|---|---|---|---|---|---|---|
| Xanthan gum | 0.3 | 0.3 | 0.3 | 0.3 | 0.3 | 0.3 | 0.3 | 0.3 |
| 19.3% 1, 2-benzisothiazolin-3-one | 0.3 | 0.3 | 0.3 | 0.3 | 0.3 | 0.3 | 0.3 | 0.3 |
| Propylene Glycol | 6.5 | 6.5 | 6.5 | 6.5 | 6.5 | 6.5 | 6.5 | 6.5 |
| Water | 61.798 | 62.798 | 61.798 | 61.798 | 61.798 | 61.798 | 61.798 | 61.798 |

Tersperse® 2500 was used as the source of 35% graft copolymer (Tersperse is a registered trademark of and available from Huntsman Petrochemical Corporation).

Agrilan® 755 was used as the source of a soft anionic polymer based on a methyl methacrylate backbone grafted with PEG (Agrilan is a registered trademark of and available from Nouryon).

Reax® 907 is used as the source of a lignin, alkali, reaction product with formaldehyde and sodium bisulfite (Reax a registered trademark of and available from Huntsman Petrochemical Corporation).

Easysperse™ P20 was used as the source of a spray-dried, optimized composite polyvinyl pyrrolidone and methyl vinyl ether/maleic acid half ester dispersant from Ashland.

Stepfac™ TSP PE-K (CAS #163436-84-8) is polyoxyethylene tristyrylphenol phosphate, potassium salt and is available from Stepan Corp.

Darvan® 811 was used as the source of a sodium polyacrylate having a molecular weight of 3500 (Darvan is a registered trademark of and available from Vanderbilt Minerals LLC).

Methods

Composition #1 and L, from Table 3, above, were homogenized and subject to 5 freeze/thaw cycles. Following the freeze thaw cycle particle size distribution was measured as in Example 3, above. Results of this experiment can be seen in Table 4, below.

Further, various dispersants were used in place of an acrylic type co-polymer having a backbone containing a carboxylated ethylenically unsaturated monomer and a non-carboxylated ethylenically unsaturated monomer. See, Compositions L-R of Table 3, above. These compositions were subjected to 50° C. for 8 weeks. Following accelerated storage conditions, Compositions L-R were measured for appearance, flow, bottom clear time, particle size distribution and dispersibility. Results of these experiments can be seen in Table 5, below.

Bottom clear time is the time until the composition flows away from the container bottom when 62.5 milliliters of the composition is placed in a 125-milliliter plastic jar and placed on its side. A high bottom clear time indicates poor composition stability.

Dispersibility/redispersibility was measured by adding one milliliter of a composition to a 100-milliliter graduated cylinder containing 99 milliliters of 342 parts per million hard water. The cylinder was then run through cycles of inversion and reversion with one complete cycle every 2 seconds to thoroughly disperse the formulation. Dispersibility was measured by leaving the cylinder undisturbed after initial dispersing and observed the phase separation at the top and bottom. The cylinder was then run through cycles of inversion and reversion with one complete cycle every 2 seconds after standing for 6 hours and 24 hours. Redispersibility is the number of cycles it takes to redisperse the composition uniformly. A high redispersibility value and/or agglomeration in the formulation while redispersing and sitting indicates poor composition stability.

TABLE 4

| | | #1 | L |
|---|---|---|---|
| Particle Size μm | D (v 0.1) | 0.769 | 1.065 |
| | D (v 0.5) | 2.207 | 4.219 |
| | D (v 0.9) | 5.054 | 11.514 |
| | % PS change | 15.73 | 122.05 |

% PS change denotes particle size change as a percentage

TABLE 5

| | | | #1 | L | M | N | O | P | Q |
|---|---|---|---|---|---|---|---|---|---|
| Appearance (top/mid/bottom) | | | 2/36/0 | tr/42/0 | tr/43/0 | 4.5/35/0 | tr/39/0 | 3/38/0 | tr/40/0 |
| 90° rotation | | | Flow | Flow | Flow | Flow | Flow | Flow | Flow |
| Bottom Clear Time (min) | | | 0 | 13 | 2 | 0 | 3 | 4 | 9 |
| Particle Size μm | D (v 0.1) | | 0.739 | 1.436 | 2.612 | 0.886 | 2.881 | 2.973 | 6.924 |
| | D (v 0.5) | | 2.626 | 34.646 | 127.901 | 3.333 | 29.011 | 34.095 | 85.068 |
| | D (v 0.9) | | 6.746 | 146.940 | 126.926 | 9.889 | 129.095 | 226.278 | 386.191 |
| | % PS change | | 37.70 | 1864.06 | 7130.13 | 89.48 | 1558.72 | 1842.74 | 4098.82 |
| Dispersibility/ Redispersibility (1 mL/99 mL) | Bloom | Tap water | fair | poor | poor | poor | poor | poor | poor |
| | 1 hour | Tap water | 0/100/0 | 1/99/tr# | 1/99/tr# | tr/100/tr# | 1/99/tr# | 1/99/tr# | 1/99/tr# |
| | 2 hours | Tap water | 0/100/0 | 1/99/tr# | 1/99/tr# | tr/100/tr# | 1/99/tr# | 1/99/tr# | 1/99/tr# |
| | 6 hours | Tap water | 0/100/tr | 1/99/tr# | 1/99/tr# | tr/100/tr# | 1/99/tr# | 1/99/tr# | 1/99/tr# |
| | 6 hours Start/end | Tap water | 1/9 | 1/3& | 1/3& | 1/11 | 1/9& | 1/10*& | 1/9& |
| | 24 hours | Tap water | 0/100/tr# | 1/99/tr# | 1/99/tr# | 1/99/tr# | 1/99/tr# | 1/99/tr# | 1/99/tr# |
| | 24 hours Start/end | Tap water | 1/19 | 1/10& | 1/7& | 1/44 | 1/10& | 1/13*& | 1/8*& | tr denotes <0.5 ml thickness of the sediment layer # denotes full layer

* Removed 99% sticky
& formulation agglomerated (big particles) (easy to move from the bottom)–poor composition stability. #1 has no agglomerated particles.

Results

As seen in Table 4, above, the addition of a dispersant, specifically an acrylic type co-polymer having a backbone containing a carboxylated ethylenically unsaturated monomer and a non-carboxylated ethylenically unsaturated monomer, resulted in over a 7-fold decrease in particle size change.

As seen in Table 5, above, the use of other dispersants results in poor stability. Specifically, these other dispersants had high particle size change, poor dispersibility. Further, all of these compositions results in flocculates/agglomerates floating on top of the composition following dispersibility/re-dispersibility testing. Thus, the addition of a dispersant, specifically an acrylic type co-polymer having a backbone containing a carboxylated ethylenically unsaturated monomer and a non-carboxylated ethylenically unsaturated monomer results in better emulsion of pyriproxyfen.

Example 5. Emulsification with and without Dispersant

TABLE 6

| % w/w | #3 | #3B | #4 | #4B | #5 | #6 | #6B |
|---|---|---|---|---|---|---|---|
| Pyriproxyfen oil solution | 14.95 | 14.95 | 29.91 | 29.91 | 14.95 | 29.91 | 29.91 |
| A poly(ethylene oxide)-poly(propylene oxide)-poly(ethylene oxide) block copolymer having an average molecular weight of 3650 and a hydrophile weight percentage of 20% | — | — | — | — | 6.13 | 12.26 | 12.26 |
| A poly(ethylene oxide)-poly(propylene oxide)-poly(ethylene oxide) block copolymer having an average molecular weight of 4950 and a hydrophile weight percentage of 30% | — | — | — | — | 0.306 | 0.612 | 0.612 |
| A poly(ethylene oxide)-poly(propylene oxide)-poly(ethylene oxide) block copolymer having an average molecular weight of 5900 and a hydrophile weight percentage of 40% | 3.676 | 3.676 | 7.354 | 7.354 | — | — | — |
| An acrylic type co-polymer having a backbone containing a carboxylated ethylenically unsaturated monomer and a non-carboxylated ethylenically unsaturated monomer | 1.23 | — | 1.23 | — | 3.68 | 1.23 | — |
| Silicone emulsion | 0.05 | 0.05 | 0.10 | 0.10 | 0.05 | 0.10 | 0.10 |
| Magnesium aluminum silicate | 0.7355 | 0.7355 | 0.429 | 0.429 | 0.7355 | 0.27 | 0.27 |
| Xanthan gum | 0.3677 | 0.3677 | 0.2145 | 0.2145 | 0.3677 | 0.1349 | 0.1349 |
| 19.3% 1, 2-benzisothiazolin-3-one | 0.3677 | 0.3677 | 0.2145 | 0.2145 | 0.3677 | 0.1349 | 0.1349 |
| Propylene Glycol | 6.13 | 6.13 | 6.13 | 6.13 | 6.13 | 6.13 | 6.13 |
| Water | 72.4931 | 73.7231 | 54.418 | 55.648 | 67.2831 | 49.2182 | 50.4482 |

Methods

Compositions #3-#6B of Table 6, above, were homogenized and subject to 50° C. for 4 weeks. Following accelerated storage conditions percent top clearing, bottom clear time and particle size were measured. Results of these experiments can be found in Table 7, below.

TABLE 7

| | | #3 | #3B | #4 | #4B | #5 | #6 | #6B |
|---|---|---|---|---|---|---|---|---|
| % Top Clearing | | ~0 | ~0 | ~0 | 2 | ~0 | ~0 | 29 |
| Bottom Clear Time (sec) | | 0 | >0 | 0 | >0 | 0 | 0 | 0 |
| Particle Size μm | D (v 0.1) | 0.587 | 0.591 | 0.648 | 0.586 | 0.640 | 0.496 | 3.342 |
| | D (v 0.5) | 0.999 | 1.005 | 1.027 | 0.996 | 1.438 | 1.032 | 6.721 |
| | D (v 0.9) | 1.650 | 1.660 | 1.573 | 1.643 | 3.802 | 2.093 | 11.725 |
| | % PS change | −2.15 | −1.95 | 1.18 | −2.64 | 5.66 | 0.19 | 438.97 |

Results

As seen in Table 7, above, the addition of an acrylic type co-polymer having a backbone containing a carboxylated ethylenically unsaturated monomer and a non-carboxylated ethylenically unsaturated monomer, resulted in better top clearing and bottom clear time. Thus, the addition of an acrylic type co-polymer having a backbone containing a carboxylated ethylenically unsaturated monomer and a non-carboxylated ethylenically unsaturated monomer results in more stable compositions.

Example 3. Control of Silverleaf Whitefly with Spirotetramat and Pyriproxyfen A bioefficacy assay utilizing a foliar spray containing Spirotetramat and pyriproxyfen was conducted on the silverleaf whitefly (*Bemisia tabaci*) on tomatoes and bell peppers. In a first assay, spirotetramat and pyriproxyfen were applied separately and concurrently to adults, nymphs and eggs of silverleaf whiteflies in 3 successive foliar applications with 7 to 10 days between applications. Control was recorded 7 days after first application, 7 days after second application and 8 days after third application. Application rates and results of this assay can be found in Table 8, below.

In a second assay, spirotetramat and pyriproxyfen were applied separately and concurrently to adults, nymphs and eggs of silverleaf whiteflies in 2 successive foliar applications with 7 to 10 days between applications. Control was recorded 8 days after second application. Application rates and results of this assay can be found in Table 9, below.

In a third assay, spirotetramat and pyriproxyfen were applied separately and concurrently to adults, nymphs and eggs of silverleaf whiteflies in 3 successive foliar application. Control was recorded 7 days after first application, 7 days after second application and 8 days after third application. Application rates and results of this assay can be found in Table 10, below.

TABLE 8

| # of Individuals per Leaf | Application Rate (g/HA) | Adults | | | Nymphs | | | Eggs | | |
|---|---|---|---|---|---|---|---|---|---|---|
| | | $1^{st}$ Appl. | $2^{nd}$ Appl. | $3^{rd}$ Appl. | $1^{st}$ Appl. | $2^{nd}$ Appl. | $3^{rd}$ Appl. | $1^{st}$ Appl. | $2^{nd}$ Appl. | $3^{rd}$ Appl. |
| Untreated | none | 13.8 | 18.0 | 16.0 | 21.3 | 49.3 | 61.5 | 11.3 | 20.5 | 23.8 |
| Spirotetramat | 87.6 | 3.3 | 2.0 | 2.0 | 17.8 | 30.5 | 16.8 | 6.5 | 13.8 | 11.0 |
| Pyriproxyfen | 75.3 | 0.5 | 1.5 | 1.0 | 0.5 | 0.8 | 0.8 | 0.5 | 2.3 | 2.0 |
| Spirotetramat Pyriproxyfen | 87.6 30.6 | 4.0 | 3.5 | 1.0 | 0.0 | 0.5 | 0.5 | 2.8 | 1.0 | 1.0 |
| Spirotetramat Pyriproxyfen | 70.0 24.5 | 2.5 | 1.0 | 3.0 | 1.0 | 1.5 | 2.0 | 0.8 | 0.8 | 0.5 |

TABLE 9

| # of Individuals per Leaf | Application Rate (g/HA) | Adults $1^{st}$ Appl. | Nymphs $1^{st}$ Appl. | Eggs $1^{st}$ Appl. |
|---|---|---|---|---|
| Untreated | none | 16.2 | 151.9 | 38.9 |
| Spirotetramat | 87.6 | 2.6 | 33.2 | 12.7 |
| Pyriproxyfen | 75.3 | 1.6 | 65.9 | 27.4 |
| Spirotetramat Pyriproxyfen | 87.6 30.6 | 1.9 | 3.7 | 1.5 |
| Spirotetramat Pyriproxyfen | 70.0 24.5 | 1.8 | 4.9 | 0.7 |

TABLE 10

| # of Individuals per Leaf | Application Rate (g/HA) | Adults | | | Nymphs | | | Eggs | | |
|---|---|---|---|---|---|---|---|---|---|---|
| | | $1^{st}$ Appl. | $2^{nd}$ Appl. | $3^{rd}$ Appl. | $1^{st}$ Appl. | $2^{nd}$ Appl. | $3^{rd}$ Appl. | $1^{st}$ Appl. | $2^{nd}$ Appl. | $3^{rd}$ Appl. |
| Untreated | none | 13.8 | 18.0 | 16.0 | 21.3 | 49.3 | 61.5 | 11.3 | 20.5 | 23.8 |
| Spirotetramat | 87.6 | 3.3 | 2.0 | 2.0 | 17.8 | 30.5 | 16.8 | 6.5 | 13.8 | 11.0 |
| Pyriproxyfen | 75.3 | 0.5 | 1.5 | 1.0 | 0.5 | 0.8 | 0.8 | 0.5 | 2.3 | 2.0 |
| Spirotetramat Pyriproxyfen | 87.6 30.6 | 2.5 | 1.0 | 3.0 | 1.0 | 1.5 | 2.0 | 0.8 | 0.8 | 0.5 |
| Spirotetramat Pyriproxyfen | 70.0 24.5 | 4.0 | 3.5 | 1.0 | 0.0 | 0.5 | 0.5 | 2.8 | 1.0 | 1.0 |

As seen in Tables 8-10, above, the mixture of spirotetramat and pyriproxyfen improves control of silverleaf whiteflies over either alone.

Example 4. Control of Vine Mealybug with Spirotetramat and Pyriproxyfen

A bioefficacy assay utilizing a foliar spray containing Spirotetramat and pyriproxyfen was conducted on the vine mealybug (*Pseudococcus maritimus*) on table grapes. Spirotetramat and pyriproxyfen were applied concurrently as a foliar spray and spirotetramat was also applied individually. Application rates and results of this assay can be found in Table 11, below.

TABLE 11

|  | Application Rate (g/HA) | % bunches infested |
|---|---|---|
| Untreated | none | 20.7 |
| Spirotetramat | 131 | 6.8 |
| Spirotetramat Pyriproxyfen | 140.1 49 | 0.4 |

As seen in Table 11, above, the mixture of spirotetramat and pyriproxyfen improves control of vine mealybugs over spirotetramat alone.

Example 5. Control of Asian Citrus Psyllid with Spirotetramat and Pyriproxyfen A bioefficacy assay utilizing a foliar spray containing Spirotetramat and pyriproxyfen was conducted on the Asian citrus psyllid (*Diaphorina citri*) on Valencia oranges. Spirotetramat and pyriproxyfen were applied concurrently and separately as a foliar spray. Application rates and results of this assay can be found in Table 12, below.

TABLE 12

|  | Application Rate (g/HA) | # of Nymphs |
|---|---|---|
| Untreated | none | 21.4 |
| Spirotetramat | 163.7 | 8.6 |
| Pyriproxyfen | 127.9 | 14.1 |
| Spirotetramat Pyriproxyfen | 175.1 61.3 | 3.1 |

As seen in Table 12, above, the mixture of spirotetramat and pyriproxyfen improves control of Asian citrus psyllid over either alone.

What is claimed is:

1. An aqueous stable composition comprising:
   spirotetramat;
   pyriproxyfen;
   a solvent system comprising heavy aromatic naphtha and cottonseed oil;
   one or more emulsifiers selected from the group consisting of a poly(ethylene oxide)-poly(propylene oxide)-poly(ethylene oxide) block copolymers and a polyalkylene oxide block copolymer;
   an acrylic type co-polymer having a backbone containing a carboxylated ethylenically unsaturated monomer and a non-carboxylated ethylenically unsaturated monomer; and
   water.

2. The composition of claim 1, wherein the solvent system further comprises acetyl tributyl citrate.

3. The composition of claim 1, further comprising one or more excipients selected from the group consisting of an anti-freeze agent, an additional dispersant, an anti-foam agent, a thickener and a preservative.

4. The composition of claim 3, wherein the anti-freeze agent is propylene glycol.

5. The composition of claim 3, wherein the additional dispersant is a sodium salt of naphthalene sulfonate condensate.

6. The composition of claim 3, wherein the anti-foam agent is a silicone emulsion.

7. The composition of claim 3, wherein the thickener is a mixture of magnesium aluminum silicate and xanthan gum.

8. The composition of claim 3, wherein the preservative is 19.3% 1,2-benzisothiazolin-3-one.

9. The composition of claim 1, wherein the composition is a suspo-emulsion.

10. An aqueous stable composition comprising:
    from about 5% to about 30% w/w spirotetramat;
    from about 1% to about 10% w/w pyriproxyfen;
    from about 1% to about 15% w/w of a solvent system comprising heavy aromatic naphtha, cottonseed oil and optionally, acetyl tributyl citrate;
    from about 1% to about 10% w/w one or more poly(ethylene oxide)-poly(propylene oxide)-poly(ethylene oxide) block copolymers;
    from about 0.1% to about 5% w/w of an acrylic type co-polymer having a backbone containing a carboxylated ethylenically unsaturated monomer and a non-carboxylated ethylenically unsaturated monomer; and
    from about 40% to about 92% w/w water,
    wherein w/w denotes weight by total weight of the composition.

11. The composition of claim 10, comprising:
    from about 10% to about 25% w/w spirotetramat;
    from about 2% to about 10% w/w pyriproxyfen;
    from about 6% to about 10% w/w of a solvent system comprising heavy aromatic naphtha, cottonseed oil and optionally, acetyl tributyl citrate;
    from about 1% to about 7% w/w one or more poly(ethylene oxide)-poly(propylene oxide)-poly(ethylene oxide) block copolymers; and
    from about 0.1% to about 5% w/w of an acrylic type co-polymer having a backbone containing a carboxylated ethylenically unsaturated monomer and a non-carboxylated ethylenically unsaturated monomer.

12. The composition of claim 10, wherein the solvent system comprises from about 1% to about 5% w/w heavy aromatic naphtha, from about 1% to about 5% cottonseed oil and optionally, from about 1% to about 5% w/w acetyl tributyl citrate.

13. An aqueous stable composition comprising:
    about 11.5% w/w spirotetramat;
    about 4.0% w/w pyriproxyfen;
    from about 3.0 to about 5.7% w/w heavy aromatic naphtha optionally, about 2.7% w/w acetyl tributyl citrate;
    from about 2.4% to about 3.7% w/w cottonseed oil;
    about 0.3% w/w of a poly(ethylene oxide)-poly(propylene oxide)-poly(ethylene oxide) block copolymer having an average molecular weight of 4950 and a hydrophile weight percentage of 30%;
    about 5.0% w/w of a poly(ethylene oxide)-poly(propylene oxide)-poly(ethylene oxide) block copolymer having an average molecular weight of 3650 and a hydrophile weight percentage of 20%;
    about 1.0% w/w of an acrylic type co-polymer having a backbone containing a carboxylated ethylenically unsaturated monomer and a non-carboxylated ethylenically unsaturated monomer; and about 61.8% w/w water, wherein w/w denotes weight by total weight of the composition.

14. The composition of claim 13, further comprising:

about 6.5% w/w propylene glycol;

about 0.5% w/w of a sodium salt of naphthalene sulfonate condensate;

from about 0.09% to about 0.15% w/w of a silicone emulsion;

about 0.6% w/w magnesium aluminum silicate;

about 0.3% w/w xanthan gum; and about 0.3% w/w 19.3% 1,2-benzisothiazolin-3-one.

15. An aqueous stable composition comprising:

about 11.5% w/w spirotetramat;

about 4.0% w/w pyriproxyfen;

from about 3.0 to about 5.7% w/w heavy aromatic naphtha optionally, about 2.7% w/w acetyl tributyl citrate;

from about 2.4% to about 3.7% w/w cottonseed oil;

about 3.1% w/w of a poly(ethylene oxide)-poly(propylene oxide)-poly(ethylene oxide) block copolymer having an average molecular weight of 5900 and a hydrophile weight percentage of 40% or about 3.1% w/w of a poly(ethylene oxide)-poly(propylene oxide)-poly(ethylene oxide) block copolymer having an average molecular weight of 7900 and a hydrophile weight percentage of 40%;

about 1.0% w/w of an acrylic type co-polymer having a backbone containing a carboxylated ethylenically unsaturated monomer and a non-carboxylated ethylenically unsaturated monomer; and about 61.8% w/w water, wherein w/w denotes weight by total weight of the composition.

16. The composition of claim 15, further comprising:

about 6.5% w/w propylene glycol;

about 0.5% w/w of a sodium salt of naphthalene sulfonate condensate;

from about 0.09% to about 0.15% w/w of a silicone emulsion;

about 0.6% w/w magnesium aluminum silicate;

about 0.3% w/w xanthan gum; and about 0.3% w/w 19.3% 1,2-benzisothiazolin-3-one.

17. A method of controlling a pest comprising applying the composition of claim 1 to an area in need of pest control.

18. The method of claim 17, wherein the pest is selected from the group consisting of an aphid, a psyllid, a mealybug, a mite and a whitefly.

19. The method of claim 17, wherein the composition of claim 1 provides improved control of the pest over spirotetramat or pyriproxyfen alone.

* * * * *